(12) United States Patent
Prevost et al.

(10) Patent No.: US 10,000,291 B2
(45) Date of Patent: Jun. 19, 2018

(54) AIRCRAFT EVACUATION SLIDE

(71) Applicant: Goodrich Corporation, Charlotte, NC (US)

(72) Inventors: Craig Erwin Prevost, Phoenix, AZ (US); Steven Evans, Sun City, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 52 days.

(21) Appl. No.: 14/864,688

(22) Filed: Sep. 24, 2015

(65) Prior Publication Data

US 2017/0088273 A1    Mar. 30, 2017

(51) Int. Cl.
*B64C 1/22* (2006.01)
*B64D 25/14* (2006.01)

(52) U.S. Cl.
CPC .......... *B64D 25/14* (2013.01); *Y10S 244/905* (2013.01)

(58) Field of Classification Search
CPC ........ B64D 25/14; B64D 25/08; B64D 25/00; B64D 25/18; B64D 9/00; B64D 2700/62508; Y10S 244/90; A62B 1/20; A62B 3/00
See application file for complete search history.

(56) References Cited

U.S. PATENT DOCUMENTS

| | | | | | |
|---|---|---|---|---|---|
| 3,070,203 A | * | 12/1962 | Dudley | .................... | A62B 1/20 182/48 |
| 3,092,232 A | | 6/1963 | Adams, Jr. | | |
| 3,370,684 A | * | 2/1968 | Holcombe | ................ | A62B 1/20 193/25 B |
| 3,433,342 A | * | 3/1969 | Switlik | .................. | B64D 25/14 193/25 B |
| 3,461,995 A | * | 8/1969 | Sidney | ..................... | A62B 1/20 193/25 B |
| 3,463,287 A | * | 8/1969 | Smith | ....................... | A62B 1/20 182/48 |
| 3,669,217 A | * | 6/1972 | Fisher | .................... | B64D 25/14 182/48 |
| 3,771,749 A | * | 11/1973 | Smialowicz | ........... | B64D 25/14 182/48 |
| 3,811,534 A | * | 5/1974 | Fisher | ...................... | A62B 1/20 182/48 |

(Continued)

FOREIGN PATENT DOCUMENTS

| | | |
|---|---|---|
| DE | 19715597 | 10/1998 |
| EP | 1306304 | 5/2003 |
| FR | 2727930 | 6/1996 |

OTHER PUBLICATIONS

European Search Report dated Mar. 1, 2017 in EP Application 16187415.1.

*Primary Examiner* — Assres H Woldemaryam
(74) *Attorney, Agent, or Firm* — Snell & Wilmer, L.L.P.

(57) ABSTRACT

According to various embodiments, disclosed is a slide configured to be supported on a ground surface at a slide angle, comprising a support structure, a sliding surface supported by the support structure, and a weakened support region in the support structure, wherein the weakened support region enables the slide to buckle and the slide angle to change in response to a bending load imposed on the slide. According to various embodiments, the slide is an aircraft evacuation slide.

13 Claims, 5 Drawing Sheets

(56) References Cited

U.S. PATENT DOCUMENTS

| | | | | |
|---|---|---|---|---|
| 3,827,094 A * | 8/1974 | Fisher | B64D 25/14 | 182/48 |
| 3,829,353 A * | 8/1974 | Fisher | A62B 1/20 | 139/384 R |
| 4,013,247 A * | 3/1977 | Giffin | B64D 25/14 | 182/48 |
| 4,018,321 A * | 4/1977 | Fisher | B64D 25/14 | 182/48 |
| 5,875,868 A * | 3/1999 | Smialowicz | A62B 1/20 | 182/48 |
| 5,975,467 A * | 11/1999 | O'Donnell | B64D 25/14 | 182/48 |
| 6,443,259 B1 * | 9/2002 | Oney | B64D 25/14 | 182/18 |
| 6,454,220 B1 * | 9/2002 | Oney | B64D 25/14 | 182/48 |
| 6,581,334 B2 * | 6/2003 | Oney | A62B 1/20 | 138/120 |
| 6,814,183 B2 * | 11/2004 | Horvath | B64D 25/14 | 182/48 |
| 6,877,696 B2 * | 4/2005 | Moro | B64D 25/14 | 182/48 |
| 6,959,658 B2 * | 11/2005 | Gronlund | B64D 25/14 | 112/475.01 |
| 8,215,586 B2 | 7/2012 | O'Donnell et al. | | |
| 2002/0117354 A1 * | 8/2002 | Baker | B64D 25/14 | 182/48 |
| 2004/0094671 A1 * | 5/2004 | Moro | B64D 25/14 | 244/137.2 |
| 2004/0118979 A1 * | 6/2004 | Moro | B64D 25/14 | 244/137.2 |
| 2005/0115794 A1 * | 6/2005 | Zonneveld | B64D 25/14 | 193/5 |
| 2008/0164432 A1 * | 7/2008 | Matsch | F16K 17/0433 | 251/85 |
| 2008/0191097 A1 * | 8/2008 | McDonald | B64D 25/14 | 244/137.2 |
| 2010/0258677 A1 * | 10/2010 | O'Donnell | B64D 25/14 | 244/137.2 |
| 2013/0213737 A1 * | 8/2013 | Bambrick | A62B 1/20 | 182/18 |
| 2015/0097083 A1 * | 4/2015 | Fellmann | B64D 9/00 | 244/137.2 |

\* cited by examiner

AIRCRAFT EVACUATION SLIDE

BACKGROUND

An inflatable evacuation slide used to convey evacuees escaping from the door of an aircraft down to the ground level should convey passengers safely and swiftly. As such, inflatable evacuation slides may typically be designed to produce a slide angle, or angle between the inclined slide and ground surface of between 25 degrees and 36 degrees based on a standard "normal" door sill height. However, adverse conditions such as aircraft tilt may cause elevated sill height, for example, of a front door in a nose up aircraft tilt, or of a back door in a nose down tilt. This may lead to unsafe evacuation conditions, as a slide designed for evacuation at normal sill height may be too short for elevated or high sill, and may form a steep slide angle (i.e. above 36 degrees) to reach ground level from the door. One method of addressing this problem may be to provide a longer slide for high sill conditions. However, at normal sill, a longer slide meant to accommodate high sill conditions may slow down evacuation rates, and have compromised beam strength. Additionally, as the slide is typically packed within an aircraft door, bulkiness, and thus increased length of the slide, is an undesired feature.

SUMMARY

In accordance with various embodiments, disclosed is a slide comprising a support structure; a sliding surface supported by the support structure; and a weakened support region in the support structure, wherein the slide is configured to be supported on a ground surface at a slide angle, the weakened support region enabling the slide to buckle and the slide angle to change in response to a bending load imposed on the slide.

According to various embodiments, disclosed is a slide comprising a support structure; a sliding surface supported by the support structure; and a weakened support region in the support structure, wherein the slide is configured to be supported on a ground surface at a slide angle, the weakened support region enabling the support structure to bend and the slide angle to change in response to a bending load imposed on the slide. In one embodiment, the weakened support region comprises a bend region, wherein the slide is configured to bend at the bend region in response to the bending load. In one embodiment, the slide is an inflatable slide used for emergency evacuation of an aircraft and configured to be packed within a compartment of the aircraft. In one embodiment, the support structure is in bordering engagement with the sliding surface, and wherein the support structure is inflatable. In one embodiment, the support structure comprises a first slide rail, a second slide rail, and a ground rail, wherein, the first slide rail and the second slide rail boarder opposite sides of the sliding surface, and the ground rail boarders a bottom side of the sliding surface, wherein the ground rail is coupled between the first slide rail and the second slide rail, and wherein the first slide rail, the second slide rail, and the ground rail form a continuous air filled tube when the support structure is inflated. In one embodiment, the bend region defines an upper tube region of the continuous air filled tube above the bend region, and a lower tube region of the continuous air filled tube below the bend region, the bend region further comprising: a first bend region on the first slide rail, and a second bend region, corresponding to the first bend region, on the second slide rail opposite the first bend region. In one embodiment, the upper tube region and the lower tube region of the continuous air filled tube comprise a first diameter which is generally uniform throughout the upper tube region and the lower tube region, and the bend region comprises a second diameter that is smaller than the first diameter. In one embodiment, the slide has a top, a ground rail, and a slide midpoint between the top and the ground rail, wherein the bend region is located below the slide midpoint. In one embodiment, the bend region is located approximately between the slide midpoint and the ground rail. In one embodiment, the slide further comprises a lower support located slightly above the bend region. In one embodiment, the lower support comprises a lower drop down support comprising a ground support bar and vertical posts, wherein the ground support bar is integrally coupled between the vertical posts, wherein the vertical posts are coupled to the support structure.

According to various embodiments, disclosed is a a slide comprising: a support structure comprising a ground rail configured to support the slide on a ground surface; a sliding surface supported by the support structure; and a weakened support region in the support structure, wherein when the slide is supported on the ground surface at a slide angle formed between the sliding surface and the ground surface, the weakened support region enables the slide angle to change in response to a bending load imposed on the slide, wherein the weakened support region defined a lower half of the support structure below the weakened support region, and wherein the lower half of the support structure is configured to bend from a first slide angle to a second slide angle. In one embodiment, the second slide angle is lower than the first slide angle. In one embodiment, the first slide angle is greater than approximately 36°.

According to various embodiments, disclosed is a slide comprising: a support structure comprising a ground rail and a lower drop down support; a sliding surface supported by the support structure; and a weakened support region in the support structure, wherein the ground rail is configured to support the slide on a ground surface at a first slide angle, and the lower drop down support is configured to support the slide on the ground surface at a second slide angle with respect to the ground surface, wherein the first slide angle is greater than the second slide angle, and wherein the weakened support region enables a slide angle to change in response to a bending load imposed on the slide. In one embodiment, the weakened support region defines a lower half of the support structure below the weakened support region, and the lower half of the support structure is configured to bend and change slide angle of the lower half of the support structure. In one embodiment, when the slide is supported by the ground rail, the first slide angle is configured to bend to a lower slide angle. In one embodiment, when the slide is supported by the lower drop down support, the second slide angle is configured to bend to a higher slide angle. In one embodiment, the second slide angle is less than about 20°. In one embodiment, the slide is an inflatable slide used for emergency evacuation of an aircraft and configured to pack within a compartment of the aircraft.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In accordance with various embodiments, and with reference to FIGS. 1A-4B, disclosed is a slide 100, including a support structure 104, comprising a weakened support region 101, enabling the slide 100 to buckle and the slide angle θ to change in response to a load imposed on the slide 100. According to various embodiments, weakened support region 101 comprises a bend region 102, wherein the slide 100 is configured to bend at the bend region 102, in response to a bending load.

According to various embodiments, the slide 100 is inflatable (and is shown in an inflated state in the figures; i.e. extending downwards along the "z" axis of reference axis 110, and forwards in the "x" direction). According to various embodiments, the slide 100 is used for emergency evacuation. According to various embodiments, the slide 100 is used for emergency evacuation of an aircraft 106 and is configured to pack within a compartment of the aircraft (i.e. the aircraft door, a slide bustle, etc.). According to various embodiments, the slide 100 comprises a sliding surface 108, wherein the support structure 104 is in bordering engagement with the sliding surface 108. According to various embodiments, at least the support structure 104 of the slide 100 is inflatable, wherein the bend region 102 is integral to at least the support structure 104. According to various embodiments, sliding surface 108 comprises a flexible fabric material such as a urethane rip stop material and/or a nylon based cloth with a urethane coating.

According to various embodiments, the slide 100 may further comprise additional structural support including at least a lower support 105.

Figure 1A:
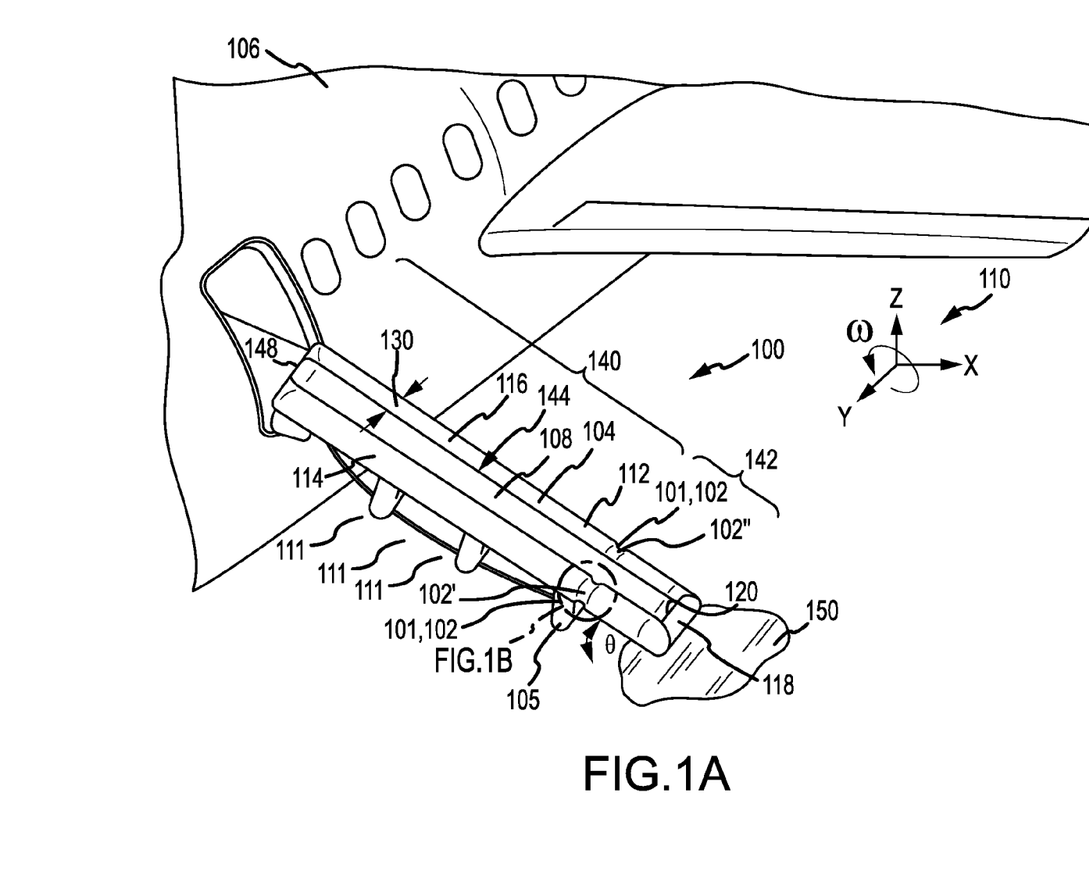
FIG. 1A is a slide including a bend component, according to various embodiments.
Figure 1B:
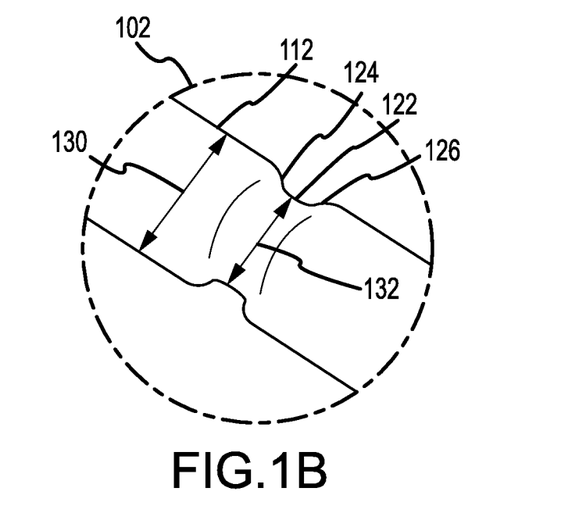
FIG. 1B is a magnified view of the bend component of the slide of FIG. 1A, according to various embodiments.
Figure 1C:
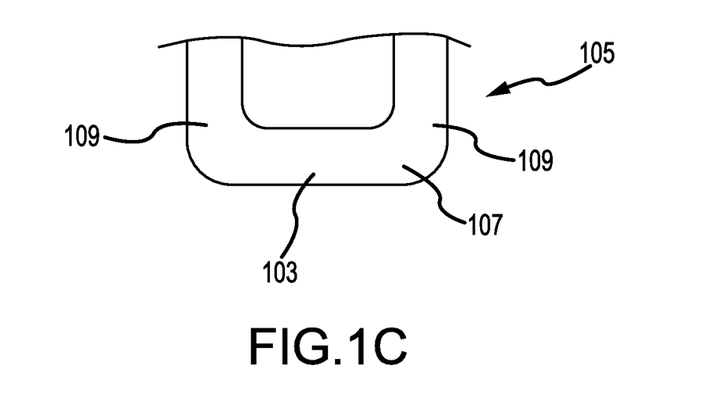
FIG. 1C is a front view of a lower support for the slide of FIG. 1A, according to various embodiments.

According to various embodiments, and with particular reference to FIGS. 1A and B, the support structure 104 comprises at least a first slide rail 114, and a second slide rail 116, which border opposite sides of sliding surface 108. According to various embodiments, the support structure 104 further comprises a ground rail 118, which boarders a bottom side 120 of sliding surface 108, and is integrally coupled between first slide rail 114 and second slide rail 116. According to various embodiments, first slide rail 114, second slide rail 116, and ground rail 118 form a continuous inflatable unit, which, in response to inflation, form an air filled tube 112 comprising bend region 102, an upper tube region 140 above bend region 102, and a lower tube region 142 below bend region 102, as shown in FIG. 1A. According to various embodiments, air filled tube 112 may be inflated at a pressure of between 2 psi (13.8 kPa) and 5 psi (34.5 kPA).

According to various embodiments, air filled tube 112 may have a generally circular cross section, as shown in FIGS. 1A and B. According to various embodiments, air filled tube 112 may have a cross section of other various geometric configurations, as will be apparent to one skilled in the art.

According to various embodiments, air filled tube 112 has a circular cross section of a first diameter 130 which is generally uniform throughout upper tube region 140 and lower tube region 142, and tapers to a second diameter 132, smaller than the first diameter 130, at bend region 102. The reduction of the second diameter 132 creates a reduced stiffness in bend region 102, thus enabling support structure 104 to buckle at that region. Other factors creating a reduced stiffness may include increasing the length of bend region 102.

According to various embodiments, bend region 102 comprises a first bend region 102' on the first slide rail 114, and a corresponding, second bend region 102" on the second slide rail 116, wherein the first bend region 102' and the second bend region 102" are located at opposite sides of the sliding surface 108. According to various embodiments, each of bend region 102 comprises a middle tapered region 122 having second diameter 132. According to various embodiments, bend region 102 further comprises an upper tapering segment 124, extending radially inwards from upper tube region 140 to middle tapered region 122, and a lower tapering segment 126, extending radially inwards from lower tube region 142 to middle tapered region 122, as shown in FIG. 1B. According to various embodiments, middle tapered region 122 may be a segment extending along the length of air filled tube 112 (as shown in FIG. 1B) or a central meeting point between upper tapering segment 124 and lower tapering segment 126 (e.g. forming a saddle profile). According to various embodiments, upper tapering segment 124 and lower tapering segment 126 may each be angled with respect to the cross section of air filled tube 112. According to various embodiments, middle tapered region 122, upper tapering segment 124, and lower tapering segment 126 may form a smooth curvature and transition seamlessly from upper tube region 140 and lower tube region 142. According to various embodiments, upper tapering segment 124 and lower tapering segment 126 may have other various profiles and orientations with respect to the cross section of air filled tube 112, for example upper tapering segment 124 and lower tapering segment 126 may be in straight planar alignment (i.e. stepped), curved radially inwards or outwards, etc. with respect to the cross section of air filled tube 112, etc., as will be apparent to one skilled in the art.

According to various embodiments, bend region 102 is located below the slide midpoint 144. According to various embodiments, bend region 102 is located approximately between the slide midpoint 144 and ground rail 118.

Specific location, sizing, design, arrangement, etc. of bend region 102, will vary and may take into account factors such as slide design, size, required/desired operational parameters, available materials, costs, etc.

According to various embodiments, lower support 105 is located near bend region 102. According to various embodiments, lower support 105 is located above bend region 102, at upper tube region 140, of air filled tube 112. According to various embodiments, lower support 105 comprises a lower drop down support 107, comprising a ground support bar 103 and vertical posts 109, forming a "U" shaped configuration, wherein ground support bar 103 is integrally coupled between vertical posts 109. According to various embodiments, ground support bar 103 and vertical posts 109 together form a continuous inflatable unit, forming a "U" shaped configuration in response to inflation, which is coupled to and configured to receive air from air filled tube 112.

According to various embodiments, slide 100 may further comprise secondary structural components 111, as shown in FIG. 1A. Such structural components may include various drop down supports, and a truss system such as a strap (shown in FIG. 1A), which may work together with lower drop down support 107 to provide additional structural stability. Other secondary structural components may include, for example, various transverse support tubes, a slide ramp, etc. Additionally, slide 100 may be designed without secondary structural components 111 and/or lower support 105, according to various embodiments. Specific embodiments may take into account factors such as available material, required/desired operational parameters, cost, slide design and size, etc.

FIGS. 2A-4B illustrate the use of slide 100 for evacuation from aircraft 106 in conditions of high sill, normal sill, and low sill, according to various embodiments. During aircraft evacuation, an evacuee is gravitationally conveyed from the top 148 of the slide 100 down to a ground surface 150. According to various embodiments, the slide 100 may be deployed from a door of aircraft 106, wherein the top 148 of the slide 100 is at door sill height above ground surface 150. According to various embodiments, the ground rail 118 of the slide 100 may be supported on the ground surface 150. According various embodiments, the lower support 105 may be supported on the ground surface 150, instead of the ground rail 118. This situation may occur at low sill conditions, wherein the slide 100 comprises lower support 105 according to various embodiments, as will be described below.

Typically, the length of an aircraft evacuation slide is designed to accommodate safe evacuation for normal sill conditions, wherein the aircraft 106 is level with the ground surface 150. Safe evacuation may involve controlling the sliding speed of evacuees in order to prevent injury due to excessive sliding speed, and ensuring that the sliding speed is sufficient to provide rapid evacuation rates (e.g. consistent with governmental standards). Thus, the slide 100 is designed, such that the angle θ of the slide 100 with respect to the ground surface 150, at normal sill, will cause an evacuee to slide at reasonable speed associated with safety and adequate evacuation rates of multiple evacuees. According to various embodiments, angle θ may be between approximately 20° and 36° for normal sill conditions. However, in emergency situations, normal sill height may not always be present. For example, the aircraft 106 may be pitched, causing a door on one end of the aircraft 106 to be elevated above normal sill, creating a high sill condition, and a door on the opposite end of the aircraft 106 to be lowered below normal sill, creating a low sill condition. Thus, an evacuation slide designed to operate at normal sill, may also be designed to accommodate high sill conditions and low sill conditions. Conditions that may create an aircraft tilt may include, for example, the failure of one of the landing gears (ie. the nose landing gear) to extend, creating a nose to tail tilt. Other conditions creating high and/or low sill conditions may include a side to side tilt of the aircraft, for example.

Figure 2A:
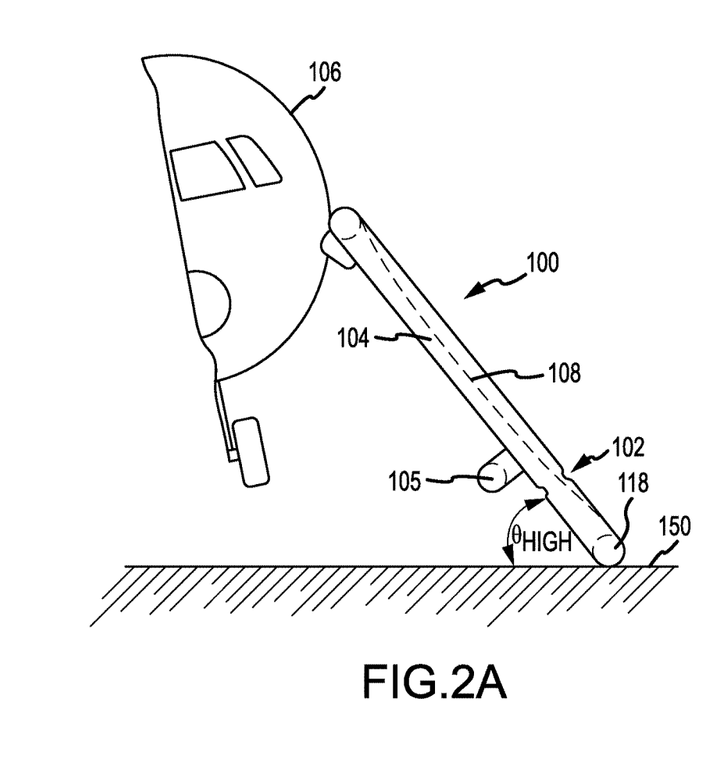
FIG. 2A is a side view of the slide of FIG. 1A, shown unloaded and at a high sill condition, according to various embodiments.
Figure 2B:
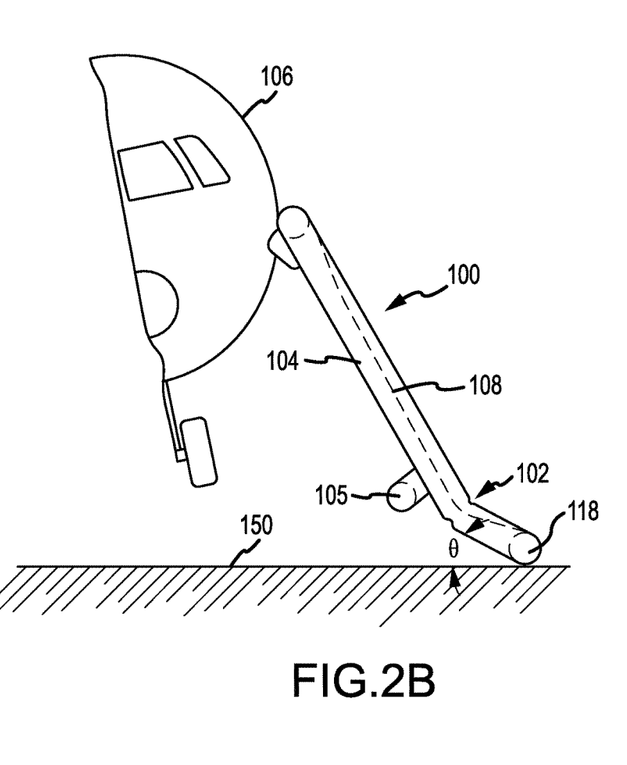
FIG. 2B is a side view of the slide of FIG. 1A, shown loaded and at a high sill condition, according to various embodiments.

FIGS. 2A and B show the slide 100 at a high sill condition, according to various embodiments, where the angle between the slide 100 and the ground is high (e.g. above 36° as indicated as $\theta_{High}$ in the figure), and ground rail 118 is supported on ground surface 150. Typically, an evacuee on the sliding surface 108 will impose a downward force (i.e. along the z direction of reference axis 110) that is conveyed to while ground surface 150 will impose an upward force at the ground rail 118. These forces will include force components orthogonal to sliding surface 108 (i.e. along the xz direction of reference axis 110). At high sill conditions, this may cause lower tube region 142 to bend or rotate upwards (in the positive w direction of reference axis 110), as the slide 100 buckles at bend region 102. Thus, the slide angle θ at lower tube region 142 will decrease from a high slide angle $\theta_{High}$ to a slide angle θ less than $\theta_{High}$, as shown in FIG. 2B.

Figure 3:
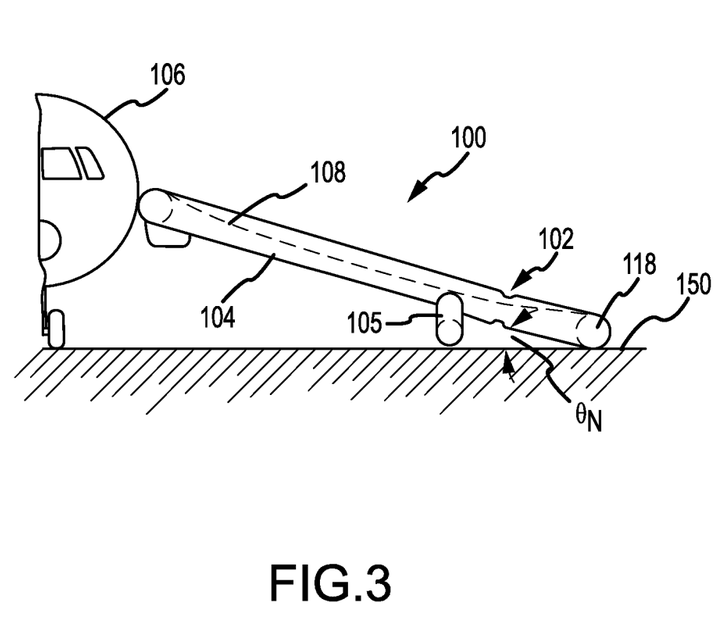
FIG. 3 is a side view of the slide of FIG. 1A, shown loaded and at a normal sill condition, according to various embodiments.

FIG. 3 shows the slide 100 at a normal sill condition according to various embodiments, where slide angle θ may be between 20° and 36° (indicated as $\theta_N$ in the figure). According to various embodiments, ground rail 118 may rest on ground surface 150 at normal sill. In some various embodiments, lower support 105 may contact the ground surface 150 instead of, or in addition to, ground rail 118 for additional support. As the force orthogonal to sliding surface 108 imposed by the ground surface 150 at the ground rail 118 is reduced as the angle θ is reduced, deflection at $\theta_N$ may typically be less than deflection at $\theta_{High}$, according to various embodiments. Additionally, the slide 100 may be designed to substantially resist deflection of the lower tube region 142 at normal sill, based on the force imposed by a sliding evacuee, according to various embodiments. Factors which may control the force required for deflection may include the size of second diameter 132 and/or a length of bend region 102. Accordingly, slide 100 may be designed to substantially resist deflection at $\theta_N$, but to buckle at $\theta_{High}$.

Thus, bend region 102 enables slide 100 to be designed with a slide length suitable for normal sill conditions, and still be used safely for high sill. The resultant slide length reduction is further advantageous for packing the slide 100 into a limited amount of space, and reducing the weight of the slide 100.

Figure 4A:
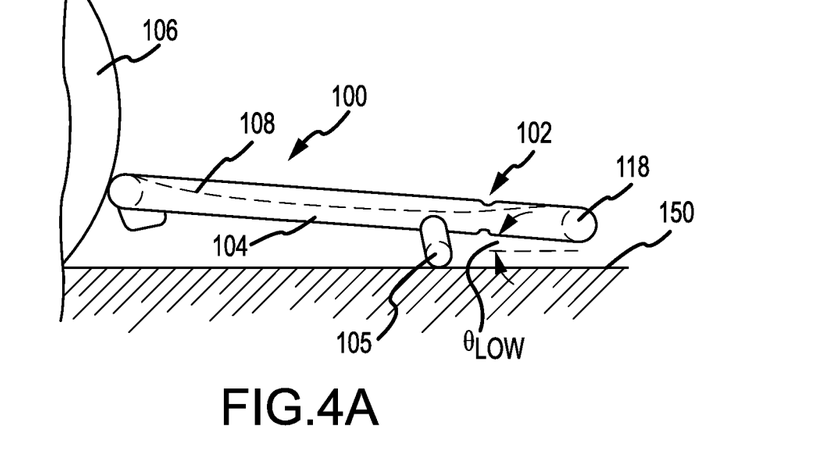
FIG. 4A is a side view of the slide of FIG. 1A, shown unloaded and at a low sill condition, according to various embodiments.
Figure 4B:
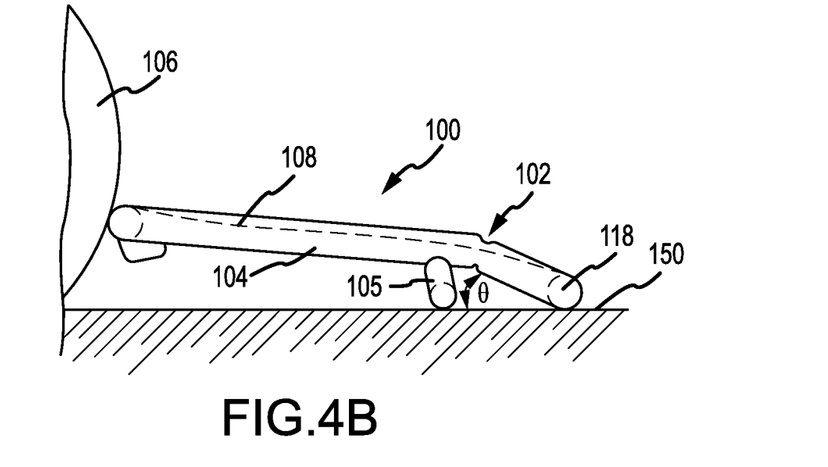
FIG. 4B is a side view of the slide of FIG. 1A, shown loaded and at a low sill condition, according to various embodiments.

FIGS. 4A and B show the slide 100 at a low sill condition, according to various embodiments, where slide angle θ is less than about 20°, according to various embodiments (indicated as $\theta_{low}$ in FIG. 3A). According to various embodiments, $\theta_{low}$ may be between 20° and 5°. According to the example shown in the figures, slide 100 includes lower support 105, which is located at upper tube region 140, above bend region 102, and typically rests on ground surface 150, while ground rail 118 is suspended above the ground surface 150 at low sill. Thus, lower support 105 imposes an upward force on sliding surface 108, wherein an evacuee imposes a downward force. As the evacuee enters lower tube region 142, the counterforces at opposites sides of bend region 102 may cause a downward bend or rotation of lower tube region 142 (i.e. in the negative ω direction of reference axis 110), as shown in FIG. 3B, according to various embodiments. Thus, the slide angle θ at lower tube region 142 may bend from a low slide angle $\theta_{low}$ to a higher slide angle, which may be at around $\theta_N$, in response to the weight of an evacuee at lower tube region 142, according to various embodiments. According to various embodiments, slide 100 may be designed to resist bending at $\theta_{low}$. Additionally, bend region 102 may also eliminate a possible "spring board" effect in lower tube region 142, as an evacuee exits the slide 100, for increased safety.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft slide comprising:
    a support structure comprising a first slide rail, a second slide rail, and a ground rail;
    a sliding surface supported by the support structure; and
    a bend region formed in the support structure and comprising a first diameter, the bend region defining an upper tube region of the support structure above the bend region and a lower tube region of the support structure below the bend region, wherein the upper tube region comprises a second diameter that is greater than the first diameter and is generally uniform throughout the upper tube region and the lower tube region comprises a third diameter that is greater than the first diameter and is generally uniform throughout the lower tube region, wherein the bend region is located between the ground rail and a midpoint of the aircraft slide, the midpoint of the aircraft slide being halfway between the ground rail and a top of the aircraft slide opposite the ground rail, and wherein
    the aircraft slide is configured to be supported on a ground surface at a slide angle relative to the ground surface, the bend region enabling the support structure to bend and the slide angle of the lower tube region to change in response to a bending load imposed on the lower tube region.

2. The aircraft slide of claim 1, further comprising a lower support having a U-shape configuration and configured to extend from the support structure toward the ground surface, wherein the lower support is located between the bend region and the midpoint of the aircraft slide.

3. The aircraft slide of claim 1, wherein the aircraft slide is an inflatable slide used for emergency evacuation of an aircraft and configured to be packed within a compartment of the aircraft.

4. The aircraft slide of claim 1, wherein the support structure is in bordering engagement with the sliding surface, and wherein the support structure is inflatable.

5. The aircraft slide of claim 1,
    wherein the first slide rail and the second slide rail boarder opposite sides of the sliding surface, and the ground rail boarders a bottom side of the sliding surface,
    wherein the ground rail is coupled between the first slide rail and the second slide rail, and
    wherein the first slide rail, the second slide rail, and the ground rail form a continuous air filled tube when the support structure is inflated.

6. The aircraft slide of claim 1, wherein, the bend region further comprises:
    a first bend region on the first slide rail, and
    a second bend region, corresponding to the first bend region, on the second slide rail opposite the first bend region.

7. The aircraft slide of claim 1, wherein the bend region of the support structure comprises:
    a middle tapered region comprising the first diameter;
    an upper tapering segment extending radially inwards from to the upper tube region of the support structure to the middle tapered region; and
    a lower tapering segment extending radially inwards from the lower tube region of the support structure to the middle tapered region.

8. The aircraft slide of claim 1, wherein the bend region is located approximately halfway between the midpoint of the aircraft slide and the ground rail.

9. The aircraft slide of claim 1, further comprising a lower support located between the bend region and the midpoint of the aircraft slide, wherein the lower support contacts the ground surface when the slide angle is 36° or less and is located off of the ground surface when the slide angle is greater than 36°.

10. The aircraft slide of claim 9, wherein the lower support comprises a ground support bar and vertical posts, wherein the ground support bar is integrally coupled between the vertical posts, wherein the vertical posts are coupled to the support structure.

11. An aircraft slide comprising:
a support structure comprising a ground rail configured to support the aircraft slide on a ground surface;
a sliding surface supported by the support structure; and
a bend region in the support structure, the bend region comprising a first diameter, wherein
the bend region defines a lower region of the support structure and an upper region of the support structure above the bend region, the lower region of the support structure comprising a second diameter greater than the first diameter of the bend region and the upper region of the support structure comprising a third diameter greater than the first diameter, the bend region being located between the lower region and a midpoint of the aircraft slide along a length of the aircraft slide, and wherein
the support structure is configured to bend at the bend region and change an angle of the lower region of the support structure with respect the ground surface in response to a bending load being imposed on the lower region of the support structure, and wherein when the angle of the lower region of the support structure with respect the ground surface is less than 20° the angle increases in response to the bending load being imposed on the lower region of the support structure, and wherein when the angle of the lower region of the support structure with respect the ground surface is greater than 36° , the angle decreases in response to the bending load being imposed on the lower region of the support structure.

12. The aircraft slide of claim 11, wherein the bend region is located between the ground rail and the midpoint of the aircraft slide, the midpoint of the aircraft slide being halfway between the ground rail and a top of the aircraft slide opposite the ground rail.

13. The aircraft slide of claim 12, wherein the support structure further comprises a lower support rail located between the bend region and the midpoint of the aircraft slide.

* * * * *